L. A. LONG.
INSECT TRAP.
APPLICATION FILED NOV. 12, 1918.
1,335,845.
Patented Apr. 6, 1920.
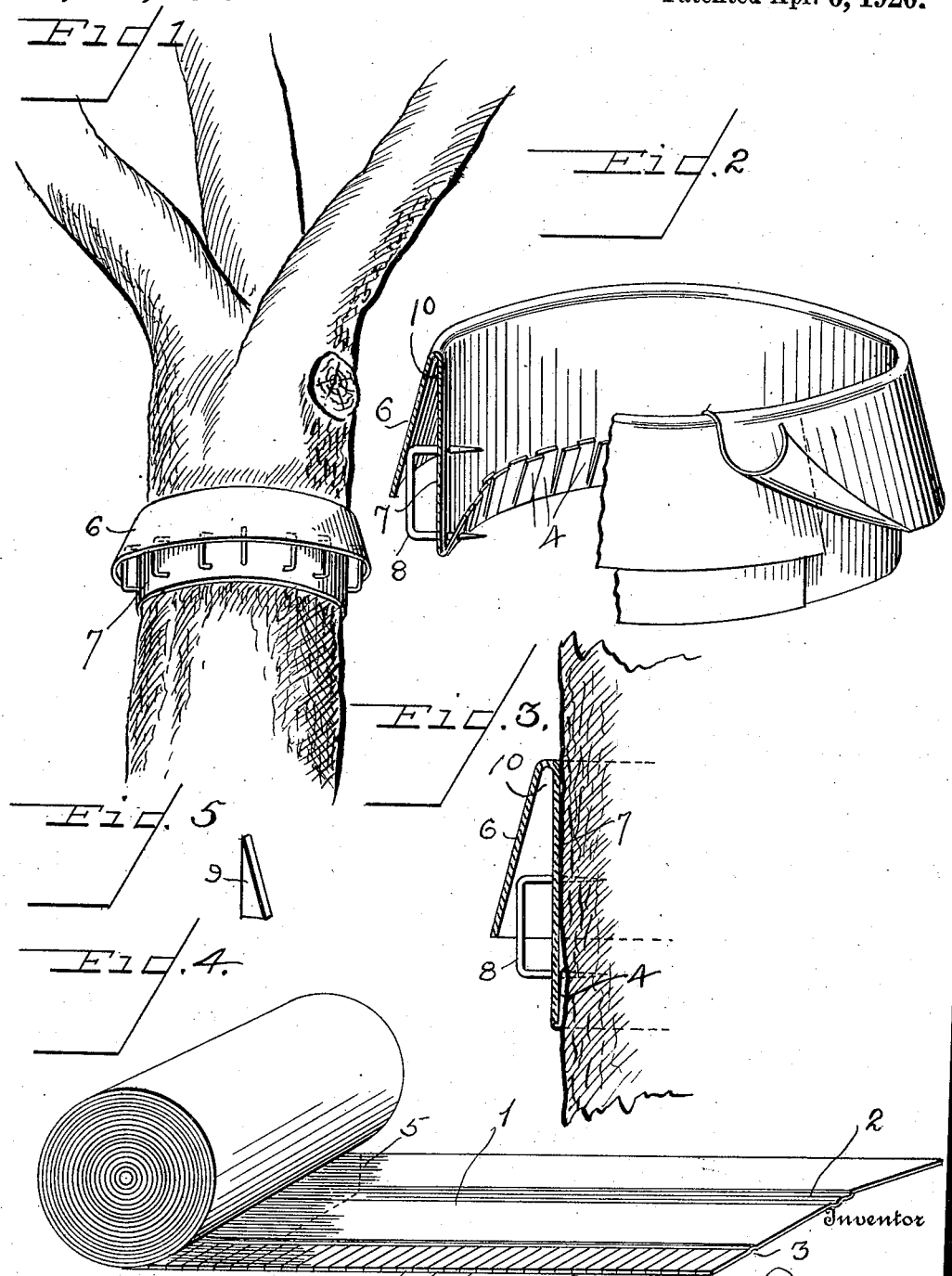

UNITED STATES PATENT OFFICE.

LEVETT A. LONG, OF DAYTON, OHIO, ASSIGNOR TO FRANK A. TRANCHANT, OF DAYTON, OHIO.

INSECT-TRAP.

1,335,845.   Specification of Letters Patent.   Patented Apr. 6, 1920.

Application filed November 12, 1918. Serial No. 262,205.

*To all whom it may concern:*

Be it known that I, LEVETT A. LONG, a citizen of the United States, residing at Dayton, in the county of Montgomery and State of Ohio, have invented certain new and useful Improvements in Insect-Traps, of which the following is a specification.

My invention relates to insect traps and more particularly to tree girdles adapted to arrest the progress of ascending insects upon the tree trunk.

The object of the invention is to simplify the structure as well as the means and mode of operation of such devices, whereby they are not only cheapened in construction, but economical in manufacture, easily and quickly applied, and unlikely to get out of repair or to quickly lose its efficiency.

A further object of the invention is to provide improved means for insuring a close fit of the girdle or barrier to the irregularities of the surface of the tree trunk, and to further provide permanent supporting means for the dependent skirt of such girdles.

With the above primary and other incidental objects in view as will more fully appear in the specification, the invention consists of the features of construction, the parts and combinations thereof, and the mode of operation, of their equivalents, as hereinafter described and set forth in the claims.

Referring to the drawings, Figure 1 illustrates the application of the insect trap forming the subject matter hereof, applied to the trunk of a tree. Fig. 2 is a perspective view, partly broken away, of the trap or girdle removed from the tree. Fig. 3 is a detail sectional view. Fig. 4 is a perspective view of the trap or girdle material in its commercial form. Fig. 5 is a perspective view of a modification of the skirt supporting element.

Like parts are indicated by similar characters of reference throughout the several views.

The insect trap herein described is of the dependent skirt type adapted to encircle the trunk of the tree, the efficiency of which is dependent upon the instinct of the insects to crawl upward. The dependent skirt affords an obstruction which can be overcome by a reversal of the direction of travel of the ascending insect which is contrary to its habit and instinct.

Traps or obstructive girdles of this type are well known in the art. However as heretofore constructed, much difficulty is experienced in applying the girdles sufficiently close to the surface of the tree trunk, particularly when the trunk is somewhat irregular in outline, or possesses a rough bark, to prevent the penetration of insects beneath the barrier. A further difficulty is found in those skirted girdles of material other than metal, through the tendency of the skirt to droop, particularly after extended exposure to weather, until its lower edge approaches sufficiently close to the tree trunk to enable the passage of the insects over the barrier.

These difficulties are overcome in the present construction by providing a resilient yielding margin on the lower edge of the girdle which will automatically adjust itself to the irregular contour of the tree trunk, closing any intervening crevices, and preventing the passage of insects beneath the girdle; and by further providing a series of spaced, rigid struts or supports for the dependent skirt, by which it is permanently held in extended position.

In constructing the device, a flexible, weather proof material of sheet form is employed. While rubberized, or waterproofed fabric, paper, composition or sheet rubber may be employed, the preferred material at the present time is commercial composition roofing, or asphalt roofing sheets. This material possesses the desired resiliency, and weather resisting qualities and is flexible and yielding whereby it will expand with the growth of the tree trunk, and thus will not injure the tree. It also possesses other desirable qualities as will be hereafter pointed out.

The device comprises a strip of such material, which in its commercial form will be provided in rolls as shown in Fig. 4. From such continuous strip the operator may cut lengths to agree with the circumference of the tree trunk to which the invention is to be applied. The strip 1 is preferably provided with longitudinal crimps or score lines 2 and 3 to facilitate the folding of the material upon itself to form the skirted trap as herein described. One edge of the material strip 1 is incised to provide a series of tongues 4 thereby affording a flexible fringe or resilient yielding margin. Each of the tongues 4 is capable of assuming an angular position different from adjacent tongues, and in the application of the device these tongues overlap one upon another somewhat as shown in Fig. 2.

The strip of material is not cut straight across in severing the length of material to be formed into the trap, but is cut angularly as at 5 throughout a part of the width of the strip to form a gore from which is formed the outstanding skirt. This gore portion from which is formed the skirt 6 is folded outward upon the score lines or crimp 2, while the incised margin comprising the series of tongues 4 is folded inward upon the score line or crimp 3. These score lines or crimps are for convenience in folding the material but are not essential and may be omitted. Likewise if the strip is cut sufficiently long the gored form or inclined ends may be omitted.

The girdle comprising the main band portion 7 from the upper edge of which projects outwardly and downwardly the skirt portion 6, and from the lower edge of which projects inwardly and upwardly the flexible tongues 4 is then extended about the tree trunk, and one end of the girdle is tucked within the skirt fold and marginal tongue fold of the opposite end of the girdle.

The tongues 4 tend to expand inward and by their resiliency press upon the trunk of the tree in overlapping relation. Some of the tongues may extend inward farther than others due to the irregular outline of the tree trunk. The main band 7 will extend across such depressions or irregularities as a cord, while the attached flexible yielding tongues extend within any depressions completely filling the same. The series of tongues thus in effect comprise an elastic margin which contracts and expands into close conformity with the irregular outline of the tree trunk.

To retain the trap in place, and at the same time fixedly support the depending skirt 6, there are employed a series of spaced independent struts, which in Figs. 1, 2 and 3 have been shown in the form of wire staples, 8 which are introduced beneath the lower edge of the skirt 6 and are driven through the band 7, and into the trunk of the tree, in different radial positions. The staples 8 being allowed to project radially afford fixed rigid supports for the skirt 6. While the skirt 6 has been shown in the drawing as slightly less in width than the inner band 7, it will be understood that the skirt may be extended to any desired width, as compared with that of the band 7.

In lieu of the staples 8 triangular wedges 9 of wood may be inserted beneath the skirt 6 and secured by nailing. Likewise a series of nails may be partially driven into the tree trunk, the projecting portions of the nails forming struts, which prop the skirt 6 in its extended position.

Insects ascending the tree trunk and being unable to pass beneath the band 7 due to the projection of the tongues 4, either singly or in multiple into the indentations of the bark, according to the width of such indentations, necessarily follow over the band 7 into the inverted pocket 10. Being averse to descending the inner side of the skirt 6, they collect in the angle of the pocket 10 and follow around the trap.

One of the desirable qualities of asphalt roofing material for this purpose is that it absorbs heat to a very high degree, whereby the interior of the pocket 10 becomes highly heated. This excessive heat in the inclosed space not only kills or weakens many insects so that they are unable to continue to cling to the device or to the tree trunk, but it also tends to render sterile the ovum of the female of the several species of insects, thereby preventing reproduction of the species by the entrapped insects. Such roofing material being of a waxy, tenacious character tends to adhere to the tree trunk, under the influence of summer heat by which the material is rendered soft and "tacky." The material thus has a sealing effect which increases its efficiency.

The skirt being fixedly supported by the struts 8 can not droop or change its form to such extent as to render the device inoperative.

From the above description it will be apparent that there is thus produced a device of the character described, possessing the particular features of advantage before enumerated as desirable, but which obviously is susceptible of modification in its form, proportions, detail construction, or arrangement of parts, without departing from the principle involved or sacrificing any of its advantages.

While in order to comply with the statute the invention is described in language more or less specific as to certain structural features, it is to be understood that the invention is not limited to the specific details shown, but that the means and construction herein described and shown, comprise but one of several modes of putting the invention into effect, and the invention is therefore claimed in any of its forms or modifications within the legitimate and valid scope of the appended claims.

Having thus described my invention I claim:

1. An insect trap of the type embodying a tree encircling girdle adapted to interfere with the progress of the insects along the trunk of the tree, comprising a strip of material folded upon itself to form an inturned margin, said margin being capable of yielding into conformity with irregularities of the surface of the tree trunk, said inturned yielding margin being overlapped and inclosed by the main portion of the strip by which said margin is pressed into engagement with the tree trunk.

2. An insect trap embodying a tree encircling girdle adapted to interfere with the progress of the insects along the trunk of the tree, comprising a strip of material one margin of which is infolded substantially into contact with the main portion of the strip, the infolded margin being compressed between the main portion of the strip and the tree trunk, substantially as specified.

3. An insect barrier, comprising a tree trunk encircling band having means for interfering with the progress of the insects upon the trunk of the tree, having an upturned marginal flange projecting intermediate the main portion of the band and the tree trunk, and held in engagement therewith by the pressure of the band thereon substantially as specified.

4. An insect barrier, comprising a tree trunk encircling band having means for interfering with the progress of the insects upon the tree trunk, having a series of marginal tongues carried by the band and inturned to positions between the band and surface of the tree trunk, and held in engagement therewith by the pressure of said band substantially as specified.

5. An insect trap comprising a strip of material adapted to encircle the trunk of a tree, said strip being folded outwardly and downwardly to form a trunk engaging band and a dependent skirt portion carried thereby which overhangs and incloses the band portion, and rigid spaced struts engaging both the band and skirt portions for maintaining the skirt portion in distended position.

6. An insect trap comprising a strip of material adapted to encircle the trunk of a tree, said strip being folded outwardly and downwardly to form a trunk engaging band and a dependent skirt portion carried thereby which overhangs and incloses the band portion, and skirt distending means projecting through the band portion and engaging with the tree trunk.

7. An insect trap comprising a strip of material adapted to encircle the trank of a tree, said strip being folded outwardly and downwardly to form a trunk engaging band and a dependent skirt portion carried thereby which overhangs and incloses the band portion, and a series of elongated staples driven partially into the tree trunk through the band portion, the projecting portions of which engage the skirt to hold same in distended position.

8. An insect barrier comprising a strip of material one edge of which is folded outward and the other edge of which is folded inward, the infolded edge comprising a series of flexible tongues, said folded strip being adapted to be passed around the trunk of a tree, and means for maintaining the outward folded edge in distended position.

9. In a device of the character described, a band having the upper portion folded outward and backward to form a pocket and having the lower edge portion cut to form flexible tongues and folded inwardly and backwardly.

In testimony whereof, I have hereunto set my hand this 5th day of November, A. D. 1918.

LEVETT A. LONG.

Witnesses:
FRANK W. KREHBIEL,
F. L. WALKER.